United States Patent [19]

Lee et al.

[11] Patent Number: 4,784,879

[45] Date of Patent: Nov. 15, 1988

[54] METHOD FOR PREPARING A MICROENCAPSULATED COMPOUND OF A PLATINUM GROUP METAL

[75] Inventors: Chi-Long Lee; Robin L. Willis, Jr., both of Midland, Mich.

[73] Assignee: Dow Corning Corporation, Midland, Mich.

[21] Appl. No.: 75,790

[22] Filed: Jul. 20, 1987

[51] Int. Cl.$^4$ .................. C08G 77/06; B01J 13/02
[52] U.S. Cl. .................. 427/213.34; 264/4.7; 427/213.36; 428/402.21; 428/402.22; 528/15; 528/491; 528/901
[58] Field of Search .................. 427/213.34, 213.36; 264/4.7; 428/402.21, 402.22; 528/491, 901, 15

[56] References Cited

U.S. PATENT DOCUMENTS

| | | |
|---|---|---|
| 3,284,406 | 11/1966 | Nelson . |
| 3,419,593 | 12/1968 | Willing . |
| 3,523,906 | 8/1970 | Nicolas et al. . |
| 3,859,223 | 1/1975 | Morishita et al. . |
| 3,886,084 | 5/1975 | Vassiliades et al. . |
| 4,181,639 | 1/1980 | Bomer et al. ............ 524/517 |
| 4,293,677 | 10/1981 | Imai . |
| 4,389,330 | 6/1983 | Tice et al. . |
| 4,402,856 | 9/1983 | Schnoering et al. ........... 428/402.22 |
| 4,411,953 | 10/1983 | Miyoshi et al. ............ 428/336 |
| 4,421,903 | 12/1983 | Ashby ............ 528/15 |
| 4,427,574 | 1/1984 | Pierpoint ............ 528/15 |
| 4,462,982 | 7/1984 | Samejima et al. . |
| 4,481,341 | 11/1984 | Schlak et al. . |
| 4,528,354 | 7/1985 | McDougal . |
| 4,542,042 | 9/1985 | Samejima et al. . |
| 4,546,164 | 10/1985 | Shen et al. ............ 528/15 |
| 4,613,659 | 9/1986 | Lee et al. ............ 528/15 |

FOREIGN PATENT DOCUMENTS 140770 5/1985 European Pat. Off. .
1354694 5/1974 United Kingdom .

*Primary Examiner*—Herbert J. Lilling
*Attorney, Agent, or Firm*—Robert Spector

[57] ABSTRACT

Compounds of metals from the platinum group of the periodic table compounds are encapsulated within a thermoplastic organic polymer using known prior art techniques. The presence of trace amounts of the encapsulated compound on the surface of the microcapsules is avoided by preparing the microcapsules by in-situ polymerization or precipitation of the encapsulant, followed by washing of the microcapsules with a solvent for the encapsulated compound that will not dissolve or swell the encapsulating polymer.

8 Claims, No Drawings

METHOD FOR PREPARING A MICROENCAPSULATED COMPOUND OF A PLATINUM GROUP METAL

BACKGROUND OF THE INVENTION

1. Field of the Invention

This invention relates to microencapsulated materials. More particularly, this invention relates to an improved method for preparing microencapsulated compounds of metals from the platinum group of the periodic table. Many of these encapsulated compounds are useful as hydrosilation catalysts for one-part, heat curable organosiloxane compositions.

2. Description of the Prior Art

One of the most useful classes of polyorganosiloxane compositions cure by a platinum catalyzed hydrosilation reaction. The advantages of these compositions relative to moisture curable polyorganosiloxane compositions is their rapid curing rate, particularly at temperatures above about 50 degrees C., and their ability to cure in thick sections. Compositions that cure by a hydrosilation reaction typically contain a polydiorganosiloxane with at least two ethylenically unsaturated hydrocarbon radical per molecule, an organohydrogensiloxane containing at least two silicon-bonded hydrogen atoms per molecule in an amount sufficient to achieve curing of the composition and a platinum-containing catalyst in an amount sufficient to promote curing of the composition. Fillers and other additives may be present for the purpose of modifying physical and/or chemical properties of the composition either prior to or following curing.

Because the aforementioned platinum catalyzed organosiloxane compositions begin to cure even at ambient temperature once the reactants are combined, the platinum catalyst and the organohydrogensiloxane reactant usually are packaged in separate containers and are not combined until it is desired to cure the composition. Even if the composition contains one or more of the known platinum catalyst inhibitors it cannot be stored in a single container for more than a few hours.

One of the alternatives proposed in the prior art to supplying platinum-catalyzed curable organosiloxane compositions as two-package materials is to isolate either the catalyst or the organohydrogensiloxane within a matrix of a material that is solid under the conditions encountered during storage of the curable composition, and which allows the entrapped reactant or catalyst to escape and mix with the other ingredients when it is desired to cure the composition.

U.S. Pat. No. 4,481,341, which issued to Schlak et al. on Nov. 6, 1984 describes thermosetting organosiloxane compositions comprising a polyorganosiloxane containing at least two ethylenically unsaturated hydrocarbon radicals per molecule, a polyorganohydrogensiloxane containing at least two silicon bonded hydrogen atoms per molecule and a platinum-containing catalyst that is dispersed in a finely divided, solid material, such as a silicone resin, at a concentration of from 0.001 to 5 percent by weight of platinum metal.

The finely divided material in which the catalyst is dispersed is virtually insoluble in either the aforementioned polyorganosiloxane or polyorganohydrogensiloxane and melts or softens at a temperature between 70 and 250 degrees C. The alleged advantage of these compositions disclosed by Schlack et al. is that the catalyst remains isolated from the other ingredients of the curable composition until the composition is heated sufficiently to melt the material in which the catalyst is dispersed. Because the organosilicon compounds present in the composition will not cure in the absence of the catalyst, the composition can allegedly be stored for long periods of time without undergoing curing or even an increase in viscosity.

A disadvantage of the curable organosiloxane compositions described by Schlak et al. is the presence of an incompatible resin in the curable composition. The maximum platinum content disclosed for the catalyst/resin mixture is 5 percent by weight, and is 0.1 percent in the single exemplified composition. The catalyst mixture is prepared by combining 100 parts by weight of a solubilized silicone resin with 10 parts of a solution of the platinum catalyst in isopropanol. The solution contains 1 percent by weight of the catalyst, based on the platinum metal content. This requires a relatively large amount of resinous carrier material in addition to the catalyst. By definition the carrier is insoluble in the other organosilicon compounds present in the composition. The carrier may therefore detract from the appearance and/or properties of the cured material.

A second potential disadvantage of Schlack et al. catalyst resides in the method used to prepare the catalyst composition. A solid block or sheet of resin containing the platinum composition dispersed throughout is ground to a fine powder. The random nature of the grinding operation makes it possible that some of the particles will contain platinum catalyst on their surface. Even trace amounts of platinum have been shown to cause premature curing of the type of organosiloxane composition exemplified in this patent.

One way to avoid the inherent disadvantages of the catalyst compositions described in the Schlack et al. patent, is to completely microencapsulate finely divided particles or droplets of a catalyst composition within a material that is impermeable to the catalyst and effectively isolates it from the reactive ingredients of a curable organosiloxane composition. The encapsulant melts or softens at the desired curing temperature of the composition.

The prior art describes several methods for microencapsulating materials, including organosilicon compounds, utilizing either chemical or mechanical means. Chemical means typically include precipitation, polymerization and/or curing of the encapsulant in the presence of the material to be encapsulated. The material to be encapsulated is present as a dispersed phase of particles or droplets in a liquid medium and the processing conditions are such that the encapsulant forms a continuous, solid film around each suspended particle or droplet.

Useful encapsulants include thermoplastic and thermosetting organic polymers, crosslinkable gelatinous and resinous materials such as gelatin and organic waxes that melt or soften at temperatures above about 50 degrees C.

The prior art discloses one-part curable organosiloxane compositions containing microencapsulated reactants or catalysts. One example of this type of art is U.S. Pat. No. 4,528,354, which issued to McDougal and Dougherty on July 9, 1985. This patent teaches a method for curing one-part peroxide curable silicone rubber compositions. The compositions include a microencapsulated liquid phase containing an organic peroxide in a shell of a resinous thermosetting material that is impervious to the peroxide. The capsules are designed to rupture under a given internal vapor pressure that is generated by the encapsulated liquid when the curable composition containing the microcapsules is heated.

Because release of the peroxide is dependent upon rupturing rather than melting of the shell separating the peroxide from the other ingredients of the organosiloxane composition, the composition and thickness of the shell must be carefully controlled to ensure that rupture of the capsules will occur reproducibly within the temperature range used to cure the organosiloxane composition.

European Published patent application No. 140,770 which issued on May 8, 1985 describes storage stable polyorganosiloxane compositions comprising a polyhydroxylated polysiloxane, a polyacyloxysilane and a microencapsulated accelerator. The coating material of the microcapsules can only be penetrated using heat and/or irradiation. Suitable encapsulating materials include polystyrene, acrylonitrile-styrene copolymers, and polymethyl methacrylate. This publication does not suggest using microencapsulated materials in organosiloxane compositions curable by means other than the reaction of polyhydroxylated polyorganosiloxanes with acyloxysilanes.

U.S. Pat. No. 4,293,677, which issued to Imai on Oct. 6, 1981 describes encapsulating organohydrogensiloxanes using complex coacervation and in-situ polymerization, two of the most common microencapsulation techniques. In accordance with Example 1 of this patent, an aqueous gelatin solution adjusted to a pH of 9.5 was added to a solution of a trimethylsiloxy terminated polymethylhydrogensiloxane in molten paraffin wax. A 10 percent by weight solution of gum arabic is then added and the pH of the resultant emulsion is adjusted to 4 over a period of two hours to precipitate the mixture of the two polyelectrolytes that forms the encapsulant. The encapsulant is cured by gradually heating the dispersion of coated particles to a temperature of 50 degrees C.

The in-situ polymerization process exemplified in Example 2 of the Imai patent involves the polymerization of styrene in the presence of a dimethylsiloxane/-methylhydrogensiloxane copolymer as the dispersed phase of an emulsion wherein the aqueous phase contains a solubilized polyvinyl alcohol and potassium persulfate.

One of the most effective classes of platinum-containing catalysts for curing organosiloxane compositions of the type described in the Imai et al. patent are reaction products of an inorganic platinum compound such as hexachloroplatinic acid with liquid vinyl-containing organosilicon compounds such as sym-tetramethyl-divinyldisiloxane. The solution is then diluted to the desired platinum content, typically between 0.1 and 1 percent by weight, using a liquid dimethylvinylsiloxy terminated polydimethylsiloxane.

When the present inventors attempted to microencapsulate one of these preferred platinum catalyst compositions by combining the composition with a solution of polystyrene in a water immiscible liquid, emulsifying the resultant composition in water and then evaporating the water immiscible liquid to precipitate the polystyrene as a coating around the droplets of catalyst composition, the resultant microcapsules were agglomerated and could not be isolated as a free flowing powder.

Washing the microcapsules with organic solvents such as toluene and methanol did little to reduce the extent of agglomeration. Curable compositions containing these microcapsules, a vinyl-containing liquid polydimethylsiloxane and a dimethylsiloxane/methylhydrogensiloxane copolymer exhibited very poor storage stability under ambient conditions, indicating that some of catalyst was either initially present on the surface of the microcapsules or had diffused through the encapsulant during storage of the curable composition.

The present inventors continued their investigations with the objective of preparing microencapsulated platinum-containing compounds that could be isolated as a free flowing powder with substantially no platinum present on the surface of the microcapsules, and which could be used to prepare storage stable organosiloxane compositions curable by a hydrosilation reaction.

SUMMARY OF THE INVENTION

Compounds of metals from the platinum group of the periodic table compounds are encapsulated within a thermoplastic organic polymer using known prior art techniques. The presence of trace amounts of the encapsulated compound on the surface of the microcapsules is avoided by preparing the microcapsules by in-situ polymerization or precipitation of the encapsulant, followed by washing of the microcapsules with a solvent for the platinum compound that will not swell or dissolve the encapsulating polymer.

DETAILED DESCRIPTION OF THE INVENTION

This invention provides a method for preparing a microencapsulated compound of a metal from the platinum group of the periodic table, said method comprising the following sequence of steps:
  A. dispersing said compound in finely divided form in a fluid medium;
  B. introducing into said medium a liquified thermoplastic organic polymer or a liquified precursor of said polymer, where said polymer is impervious to said compound,
  C. depositing a solid coating of said polymer around each particle of said compound in an amount equal to at least 50 percent of the combined weight of said compound and said coating, and
  D. recovering the resultant microencapsulated platinum group metal compound,
the improvement comprising washing the particles of said microencapsulated compound with a liquid that is a solvent for said compound but not for said polymer.

For purposes of convenience, the term "platinum compound" will be used hereinafter to refer to compounds of any metal in the platinum group of the periodic table of the elements.

The inventive feature of the present method comprises washing the recovered microcapsules with a liquid that is a solvent for the platinum compound but not for the organic polymer that encapsulates the compound.

Microencapsulated platinum compounds prepared using the method of this invention are in the form of free-flowing powders. Polyorganosiloxane compositions containing the microencapsulated compounds as curing catalysts are stable for extended periods of time, typically several months or longer, under ambient conditions, yet cure relatively rapidly at temperatures above the melting or softening point of the encapsulant.

The microencapsulated platinum compounds of this invention comprise a liquid, solid or solubilized compound of platinum or other element from the platinum group of the periodic table. The compound is completely enveloped by a coating of a thermoplastic organic polymer that is solid on at least its exterior portion. In one embodiment the encapsulated material is a finely divided solid such as silica that has been treated with the aforementioned liquid or solubilized platinum compound prior to being encapsulated.

As used herein the term "microcapsules" refers to heterogeneous microparticles consisting essentially of the platinum compound together with any associated liquids and/or solids that is surrounded by the thermoplastic organic polymer. The platinum compound can be dispersed throughout the microcapsule or localized as one or more cores within a shell of the organic polymer.

The present microcapsules are essentially spherical in contour with diameters of up to 500 microns, although particles with diameters of less than 50 microns are preferred because they are more readily incorporated into curable organosiloxane compositions. Depending upon the method used to prepare the microcapsules, they can deviate from this contour at one or more locations around their perimeter, particularly if the encapsulated material is a solid particle that was treated with a liquid or solubilized platinum compound prior to being encapsulated.

The platinum compound together with any liquids used to dissolve and/or dilute the compound and any solid carriers typically constitutes up to 50 percent of the total weight of the present microcapsules. It has been found that it is not feasible to encapsulate all of the platinum compound and any associated liquid materials using conventional microencapsulation methods when this limit is exceeded. The excess platinum compound typically collects on the surface of the microcapsules, and often results in premature curing of organosiloxane compositions containing these microcapsules as latent catalysts. One method for avoiding premature curing is to wash the microcapsules as described hereinafter.

Any of the known platinum compounds described in the prior art can be microencapsulated using the method of this invention. Preferred compounds are those which function as hydrosilation catalysts for curable organosiloxane compositions. Reaction products and complexes of inorganic compounds of platinum, particularly halogen compounds, with organosilicon compounds are preferred because these catalysts are compatible with the reactants present in curable organosiloxane compositions.

As indicated in the preceding "Description of the Prior Art", microencapsulated materials are prepared by a variety of methods, many of which can be used in practicing the present invention.

Chemical methods for microencapsulation are described in U.S. Pat. No. 3,859,228, which issued to Morishita et al. on Jan. 7, 1975; U.S. Pat. No. 4,462,982, which issued to Samejima et al. on July 31, 1984; British Pat. No. 1,354,694, which issued on May 30, 1974; U.S. Pat. No. 4,411,933, which issued to Samejima et al. on Oct. 25, 1983; U.S. Pat. No. 4,402,856, which issued to Schnoering et al. on Sept. 6, 1983; U.S. Pat. No. 4,542,042. which issued to Samejima et al. on Sept. 17, 1985; U.S. Pat. No. 3,886,084. which issued to Vassiliades on May 27, 1975; and U.S. Pat. No. 4,181,639. which issued on Jan. 1, 1980.

U.S. Pat. No. 3,523,906, which issued to Alois and Nicolas on Aug. 11, 1970, describes a microencapsulation method using a preformed polymer as the encapsulant. The solubilized encapsulant is emulsified in an aqueous medium containing a hydrophilic colloid. The encapsulant can be any vinyl polymer or copolymer, a polycarbonate, polyester, polysulfonate, polyurethane, polyamide, chlorinated natural rubber or a cellulose derivative that is soluble in a water immiscible solvent and in the solvent-free state forms a dry, solid, water insoluble film.

U.S. Pat. No. 4,389,330, which issued to Tice and Lewis on June 21, 1983 discloses a microencapsulation process whereby an active agent is dissolved or dispersed in a solvent and the encapsulating material is dissolved in the same solvent. The solvent containing the active agent and encapsulant is then dispersed in a continuous phase processing medium and a portion of the solvent is then evaporated to precipitate the encapsulant around the active ingredient in the form of microcapsules suspended in the aforementioned continuous phase. The novel feature of this method resides in extracting the remainder of the solvent at this stage, i.e. after the microcapsules have been formed and remain suspended in the continuous medium in which they are formed.

Microencapsulated materials can also be formed by mechanical means that typically set the solid particles to be encapsulated in motion by centrifugal force or air currents in a fluidized bed reactor. The particles are directed through a film or spray of molten or solubilized encapsulant.

The first step of the present method involves dispersing a finely divided platinum compound in a fluid medium that is not a solvent for the platinum compound. The term "fluid medium" includes both liquids and gases. Methods for dispersing finely divided solids and immiscible liquids in liquid media are well known in the art. Dispersing of the platinum compound in a gaseous medium can be accomplished using, for example, a fluidized bed reactor.

The thermoplastic organic polymer that is used to encapsulate the platinum compound in accordance with the present method is introduced into the liquid medium containing dispersed particles or droplets of the compound as a preformed polymer, such as polystyrene, or as a precursor comprising one or more monomers that are polymerized in the presence of the dispersed platinum compound to form the encapsulant.

In accordance with one variation of the present method for preparing microencapsulated platinum compounds, at least one monomer is polymerized on the surface of the particles to be encapsulated. The monomer can be an ethylenically unsaturated organic monomer such as ethylene, styrene, vinyl chloride, vinylidene chloride, or an ester of acrylic or methacrylic acid such as methyl methacrylate. Mixtures containing two or more of these ethylenically unsaturated monomers can be used, depending upon the physical and chemical properties desired for the encapsulant. Preferred monomer mixtures include mixtures of styrene and acrylonitrile, and mixtures of vinylidine chloride with other ethylenically unsaturated monomers.

Alternatively, the polymerization reaction used to prepare the encapsulating polymer can involve a condensation reaction between two or more monomers or a single cyclic monomer such as a lactone or lactam. An example of such a condensation polymerization that has been used to prepare the encapsulant is the interfacial reaction between sebacoyl chloride and hexamethylene diamine to yield a polyamide.

At least one of the condensable monomers together with the particles to be encapsulated are emulsified in an aqueous medium, which can also contain a catalyst for the polymerization. Depending upon the type of monomer(s) selected, formation of the encapsulating polymer is effected by heating, exposure to ultraviolet or other type of radiation, or allowing the reactants of a condensation polymerization to contact one another in the presence of an appropriate catalyst.

If it is desired to precipitate a pre-formed polymer in the presence of the dispersed platinum compound, one method for accomplishing this is coacervation, which is typically a three step process. In the first step a liquid vehicle forms the continuous phase, and at least one polyelectrolyte in liquified form together with the material to be encapsulated forms the dispersed phase. The liquid vehicle initially contains the solubilized encapsulant that is subsequently phased out of solution as a liquid coacervate to establish a three-phase system. In a simple coacervation process the encapsulant is a single polyelectrolyte such as gelatin. Complex coacervation involves using two polyelectrolytes of opposite charge, such as gelatin and gum arabic, that are concurrently phased out of solution.

The phasing out of a simple coacervate can be accomplished in a number of ways, including changing the temperature of the system, or by addition of a salt or a nonsolvent for the encapsulant. In a complex coacervation process the encapsulant can be precipitated by changing the pH of the composition.

The second step of a coacervation process involves deposition of the encapsulant phase around droplets or solid particles of the material to be encapsulated. For this to occur. there must be a driving force for adsorption of the encapsulant at the surface of the material to be encapsulated.

During the third step of the process the encapsulant is solidified. The means for accomplishing this can be a continuation of the one used to bring about separation of the encapsulant during the second step of the process, or the encapsulant can be solidified by chemical means, including crosslinking, chelation or grafting. The resultant particles of encapsulated material can be isolated by conventional filtration and drying techniques. The size of the particles and the thickness of the coating is a function of several variables, including the relative concentrations of encapsulant and substrate and the rate of stirring during the coacervation process.

One of the preferred methods for preparing microencapsulated platinum compounds in accordance with the present invention is a physico-chemical one whereby a solubilized encapsulant is precipitated in the presence of the platinum compound. Preferred polymers are those formed from the monomers discussed hereinabove in connection with the in-situ polymerization method for forming microcapsules.

The solvent for the encapsulating polymer must be immiscible with water. In addition, the boiling point of either the solvent alone or an azeotropic mixture of the solvent and water must be below the melting point of the encapsulating polymer.

The dispersion of platinum compound in the solubilized encapsulating polymer is then emulsified in an aqueous medium and the solvent is removed by evaporation. Depending upon the boiling point of the solvent, evaporation can be achieved at ambient temperature by stirring the emulsion while passing an inert gas such as nitrogen through the reactor. Removal of higher boiling solvents such as toluene may require heating the emulsion under ambient or reduced pressure. The process conditions during the evaporation of solvent are such that the encapsulant precipitates as a film around each of the suspended particles.

The method for microencapsulation of a platinum compound with a preformed, solubilized thermoplastic polymer typically comprises the following series of steps:

A. emulsifying in an aqueous medium the platinum compound in finely divided form and a solution of the encapsulant in a water-immiscible liquid, wherein the platinum compound constitutes up to 50 percent of the combined weight of said compound encapsulant, B. evaporating an amount of said water immiscible liquid sufficient to precipitate said encapsulant as a coating around substantially all of the particles of said compound, and C. solidifying and recovering the resultant microcapsules.

The aqueous medium in which the encapsulant and encapsulating polymer are emulsified can contain a surfactant or an emulsifying agent such as polyvinyl alcohol to facilitate formation of the emulsion. The surfactant selected should be one that does not react with the platinum compound. For example, surfactants containing amino or mercapto groups should not be used, because these groups are known to inhibit the activity of the platinum compound as a hydrosilation reaction catalyst.

Regardless of the method used to form the microencapsulated platinum compounds, to ensure the substantial absence of platinum compound on the outer surface of microcapsules, the microcapsules are washed with a solvent for the platinum compound that will not dissolve the encapsulant. It has been found that even trace amounts of platinum on the surface of the microcapsule can result in premature curing of organosiloxane compositions containing the microencapsulated platinum compounds of this invention as catalysts.

If the platinum compound is a reaction product of hexachloroplatinic acid with an ethylenically unsaturated liquid organosilicon compound such as a sym-tetraalkyldivinyldisiloxane, the liquid used to wash the microcapsules is preferably a liquid cyclic or linear polydialkylsiloxane that is a solvent for the platinum compound but not the encapsulant. Most preferably the alkyl radicals on both the reactant and the washing liquid are methyl.

Microencapsulated platinum compounds prepared using the present method are particularly suitable for use in one-part, storage stable organosiloxane compositions that are curable by a platinum-catalyzed hydrosilation reaction. In addition to one of the present microencapsulated platinum compounds as a catalyst the compositions comprise (A) a polyorganosiloxane containing at least two ethylenically unsaturated hydrocarbon radicals per molecule and (B) a polyorganohydrogensiloxane containing at least two silicon-bonded hydrogen atoms per molecule. To ensure adequate crosslinking and an acceptable level of physical properties the sum of the average number of ethylenically unsaturated hydrocarbon radicals per molecule of polyorganosiloxane (A) and the average number of silicon-bonded hydrogen atoms per molecule of polyorganohydrogensiloxane (B) is greater than 4.

The polyorganosiloxane containing at least two ethylenically unsaturated hydrocarbon radicals per molecule, referred to hereinafter as (A), can be any of those typically used in organosiloxane compositions that are curable by a platinum-catalyzed hydrosilation reaction. Ingredient (A) can be a liquid consisting of at least in part of diorganovinylsiloxy or organovinylsiloxane units, and at least a portion of the repeating units of (A) contain silicon-bonded methyl radicals.

For the purposes of this invention, the diorganovinylsiloxy group contains a vinyl radical and two methyl radicals bonded to silicon or a vinyl, a phenyl and a methyl radical bonded to silicon.

If (A) is a liquid, its viscosity is preferably from 1 to 500 Pa.s. Polymers of this type are well known and commercially available. A preferred embodiment of (A) is a polydiorganosiloxane containing at least one monoorganosiloxane unit per molecule, resulting in branching of the polymer molecule. Polymers of this type are described in U.S. Pat. No. 3,284,406 to Nelson, which issued on Nov. 8, 1966.

Alternatively, (A) can be a semi-solid gum exhibiting a viscosity of 1000 Pa.s or greater at 25 degrees C.

Ingredient (A) is cured by a hydrosilation reaction between the ethylenically unsaturated hydrocarbon radicals of this ingredient and the silicon-bonded hydrogen atoms of the curing agent (B).

Ingredient (B) is an organohydrogensiloxane containing an average of at least three silicon-bonded hydrogen atoms per molecule. It can contain from as few as four silicon atoms per molecule up to an average of 20 or more, and exhibit a viscosity of up to 10 Pa.s or higher at 25 degrees C. Ingredient (B) contains repeating units of the formulae $HSiO_{1.5}$, $R'_2 HSiO$ and/or $R'HSiO_{0.5}$. The molecules of this ingredient may also include one or more monoorganosiloxane, diorganosiloxane, triorganosiloxy and $SiO_2$ units that do not contain silicon bonded hydrogen atoms. In these formulae R' is a monovalent hydrocarbon radical as defined hereinabove for the R radical of ingredient (A). Alternatively, ingredient (B) can be a cyclic compound containing diorganosiloxane and organohydrogensiloxane units, or a compound of the formula $Si(OSiR'_2H)_4$.

Most preferably R' is methyl and ingredient (B) is a linear trimethylsiloxy terminated polymethylhydrogensiloxane or a dimethylsiloxane/methylhydrogensiloxane copolymer containing an average of from 10 to about 50 repeating units per molecule of which from 3 to 5 are methylhydrogensiloxane.

The molecular weights of ingredients (A) and (B) together with the number and distribution of the silicon-bonded hydrogen atoms and ethylenically unsaturated hydrocarbon radicals within these ingredients will determine the location of crosslinks in the cured elastomer. The concentration of crosslinks per unit volume is often referred to as the "crosslink density" and determines certain physical properties of the cured elastomer, particularly hardness, tensile strength and elongation. The particular combination of polydiorganosiloxane(s) and curing agent(s) yielding the desired combination of physical properties can readily be determined by routine experimentation with a knowledge of this invention.

The molar ratio of silicon bonded hydrogen atoms to vinyl or other ethylenically unsaturated hydrocarbon radicals present in the curable compositions of this invention is a major factor in determining the properties of the cured elastomer. Because of the difficulty often experienced in achieving a complete reaction between all of the silicon bonded hydrogen atoms and all of the vinyl or other ethylenically unsaturated hydrocarbon radicals present in the reaction mixture, it is desirable to have an stoichiometric excess of one of these species in a curable composition. In the present compositions this ratio is from 1.0 to 1.6 silicon-bonded hydrogen atoms per vinyl or other ethylenically unsaturated hydrocarbon radical. The preferred ratio for a given composition will be determined at least in part by the average molecular weight of ingredient (A) and the type of curing agent.

The following examples describe preferred embodiments of the present method for preparing microencapsulated platinum compounds and the storage stability of one-part curable organosiloxane compositions prepared using these microencapsulated compounds as catalysts. The examples should not be interpreted as limiting the scope of the invention defined in the accompanying claims.

Unless otherwise specified all parts and percentages in the examples are by weight and all viscosities were measured at 25 degrees C.

EXAMPLE 1

This example describes the preparation of a preferred type of microencapsulated platinum compound by precipitating a coating of polystyrene around the compound. The use of this class of platinum compounds as hydrosilation catalysts is described in U.S. Pat. No. 3,419,593, which issued to Willing on Dec. 31, 1968. The platinum compound was prepared by reacting hexachloroplatinic acid and sym-tetramethyldivinyldisiloxane and diluting the reaction product with a liquid dimethylvinylsiloxy terminated polydimethylsiloxane to achieve a platinum content of 0.7 percent. This example also demonstrates the criticality of washing the microcapsules with a solvent for the platinum compound prior to incorporating the microcapsules in a curable organosiloxane composition.

A reactor equipped with a mechanically operated stirrer and nitrogen inlet was charged with 300 cc. of water and 15 g. of a partially hydrolyzed polyvinyl alcohol available as Vinol 205 from Air Products Co. This mixture was stirred until the polyvinyl alcohol dissolved, at which time a solution containing 2.67 g. of the platinum compound, 17.33 grams of polystyrene and 300 cc of methylene chloride was gradually added over a period of one half hour. Following completion of the addition the mixture in the reactor was stirred using a stirrer speed of 400 r.p.m. for one hour, at which time 2000 cc of water was added to reduce foaming. This mixture was stirred for 15 ½ hours under ambient conditions while passing a stream of nitrogen through the reactor, after which the contents of the reactor were heated at 40 degrees C. for 8 ¾ hours while maintaining the flow of nitrogen, and were then allowed to remain under ambient conditions for about 16 hours.

This mixture was then centrifuged to concentrate the microcapsules which had formed. The microcapsules were isolated by filtration, washed once with water, twice with methanol, and then allowed to dry for one day. A portion of the microcapsules were retained as sample 1 for incorporation into a curable organosiloxane composition.

The remainder of the microcapsules were combined with cyclic polydimethylsiloxanes, a known solvent for the platinum compound, stirred for two hours and then isolated from the liquid. The resultant capsules, referred to herein as sample 2, contained 70.8 percent of polystyrene and 29.2 percent of the platinum compound, equivalent to 0.184 percent platinum metal.

A one-part curable organosiloxane composition of this invention was prepared by blending the following ingredients to homogeneity:

14.3 parts of a liquid polyorganosiloxane (A) exhibiting a viscosity of 0.8 Pa.s and containing the following repeating units, expressed as mole percentages, where Me represents methyl and Vi represents vinyl:

| Unit | Percent |
|---|---|
| $MeSiO_{1.5}$ | 3.5 |
| $Me_2ViSiO_{0.5}$ | 0.7 |
| $Me_3SiO_{0.5}$ | 2.8 |
| $Me_2SiO$ | 93.0 |

0.71 parts of a dimethylhydrogensiloxy terminated polydimethylsiloxane containing an average of 10 repeating units per molecule (B), and 0.23 parts of one of the microencapsulated platinum compounds referred to as samples 1 and 2 hereinabove, equivalent to 3 ppm of platinum.

The composition containing catalyst sample 1 cured within 3 days at room temperature.

The composition containing catalyst sample 2 that had been washed with cyclic polydimethylsiloxanes did not cure during storage for 300 days under ambient conditions. When the composition was heated at 45 degrees it required 12 days to cure. The same composition cured in less than five minutes when heated at 150 degrees C.

EXAMPLE 2

This example describes the preparation and evaluation of a platinum compound encapsulated within a layer of polymethyl methacrylate.

A reactor equipped as described in Example 1 was charged with 300 cc. of water and 15 grams of the polyvinyl alcohol described in Example 1 and the contents of the reactor were stirred to obtain a homogeneous solution.

A solution prepared by blending 27.64 g. of polymethyl methacrylate. 250 cc of methylene chloride and 2.36 g. of a platinum catalyst was gradually added to the reactor to minimize foaming. The catalyst was a reaction product of hexachloroplatinic acid and sym-tetramethyldivinyldisiloxane and contained 4% platinum.

The resultant mixture was stirred for about 16 hours while a stream of nitrogen was passed through the reactor. The microcapsules which formed were isolated and washed as described in Example 1. The capsules were found to contain 86 percent polymethyl methacrylate and 14 percent of the platinum-containing catalyst, equivalent to 0.056 weight percent platinum.

A one-part curable organosiloxane composition was prepared by blending the following ingredients described in Example 1 to homogeneity.

32.0 parts of (A)
1.6 parts of (B)
0.052 part of polymethyl methacrylate microcapsules, equivalent to 3 ppm of platinum The composition did not cure during storage for 210 days under ambient conditions but cured in less than 15 minutes when heated at 150 degrees C.

EXAMPLE 3

This example describes the preparation and evaluation of a microencapsulated platinum compound of this invention where the encapsulant is a styrene/acrylonitrile copolymer.

To a reactor equipped as described in Example 1 and containing a solution prepared by blending 15 g. of the polyvinyl alcohol described in Example 1 with 300 cc. of water was gradually added a solution prepared by blending to homogeneity 27.64 g of a styrene/acrylonitrile copolymer available as Dow SAN 35% from the Dow Chemical Company, 2.37 g. of the platinum compound described in Example 2 and 250 cc. of methylene chloride. The liquid in the reactor was stirred using a stirrer speed of 400 r.p.m. Following completion of the addition the contents of the reactor were stirred under ambient conditions for about 16 hours while the flow of nitrogen through the reactor was continued.

The microcapsules that formed were isolated by filtration, washed with methanol, filtered, and washed with cyclic polydimethylsiloxanes. The microcapsules were in the form of a fluffy powder with no detectable agglomeration. The microcapsules contained 96.2 percent of the styrene/acrylonitrile copolymer and 3.8 percent of the platinum compound, equivalent to 0.144 percent of platinum metal.

A curable composition was prepared by blending 0.0561 g. of the microencapsulated platinum compound together with the following reactants described in the preceding Example 1:

33.15 g. of (A) and
1.67 g. of (B)

This composition did not cure during a 210 day exposure to ambient conditions but cured in less than 15 minutes when heated at a temperature of 150 degrees C.

EXAMPLE 4

This example demonstrates the utility of the present microencapsulated platinum compounds as catalysts in a one part high consistency curable organosiloxane elastomer composition. The following ingredients were blended to homogeneity by passing them eight times through a two-roll mill to form part A1 of a curable composition of this invention:

19.93 grams of an organosiloxane polymer composition and
0.7 gram of a microencapsulated platinum compound prepared as described for sample 2 in the preceding Example 1 and containing 10 percent by weight of the platinum-containing compound and 90 percent of polystyrene as the encapsulating polymer.

Part A2 was prepared in a similar manner using 20 grams of the organosiloxane polymer composition and 0.088 gram of a platinum compound encapsulated in an acrylonitrile/styrene copolymer. The encapsulated compound was prepared as described in the preceding Example 3.

Part B or the curable composition was prepared by blending the following ingredients to homogeneity:

100 grams of the same organosiloxane polymer composition used to prepare part A1 and A2
2.0 grams of a trimethylsiloxy endblocked polydiorganosiloxane having an average of five methylhydrogensiloxane units and three dimethylsiloxane units per molecule and containing from 0.7 to 0.8 weight percent of silicon-bonded hydrogen atoms.

The organosiloxane polymer composition consisted essentially of

- 92.5 parts by weight of a dimethylvinylsiloxy terminated polydimethylsiloxane containing 0.12 mole percent of dimethylvinylsiloxy units and exhibiting a Williams plasticity of about 60 mils,
- 7.5 parts of a dimethylvinylsiloxy terminated dimethylsiloxane/methylvinylsiloxane copolymer containing 2 mole percent methylvinylsiloxane units, about 0.8 weight percent of vinyl radicals and exhibiting a Williams plasticity of about 60 mils,
- 8.0 parts of a hydroxyl endblocked polydimethylsiloxane fluid having a viscosity of about 0.04 Pa.s at 25 degrees C. and containing about 4 weight percent of silicon-bonded hydroxyl groups,
- 0.35 parts of a hydroxyl terminated diorganosiloxane copolymer wherein the repeating units consist essentially of dimethylsiloxane and methylvinylsiloxane units, and the copolymer contains about 10 weight percent of vinyl radical and about 16 weight percent of hydroxyl radicals, and
- 38 parts of a fume silica having a nominal surface area of 250 m² per gram.

Two curable compositions were prepared by softening part A1 and A2 individually on a two roll-mill and then blending each material with an equal weight of the part B material using a two-roll mill. The two resultant curable compositions were stored for eight months under ambient conditions. At the end of this period neither composition had cured. The compositions could be cured by heating them for several minutes at a temperature of 150 degrees C.

That which is claimed is:

1. In a method for preparing a microencapsulated compound, said method comprising the following sequence of steps:
   A. dispersing said compound in finely divided form in a fluid medium;
   B. introducing into said medium a liquified thermoplastic organic polymer or a liquified precursor of said polymer, where said polymer is impervious to said compound,
   C. depositing a solid coating of said polymer around each particle of said compound in an amount equal to at least 50 percent of the combined weight of said compound and said coating, and
   D. recovering the resultant microencapsulated compound, the improvement comprising (1) selecting said compound from compounds of platinum group metals and (2) washing the recovered microencapsulated compound with a liquid that is a solvent for said compound but not for said polymer.

2. A method according to claim 1 where said thermoplastic organic polymer constitutes at least 50 percent of the combined weight of said compound and said polymer, and said polymer is derived from at least one ethylenically unsaturated organic compound or a condensation reaction between at least two organic compounds containing a plurality of condensible groups per molecule.

3. A method according to claim 2 where said layer of thermoplastic organic polymer is formed by precipitation of a preformed polymer in the presence of said compound in the form of finely divided liquid droplets or solid particles.

4. A method according to claim 2 where the thermoplastic polymer is formed in the presence of said compound in finely divided form.

5. A method according to claim 2 where said compound is the reaction product of an organosilicon compound and a reactant comprising a platinum atom and at least one halogen atom, and said ethylenically unsaturated organic compound is selected from the group consisting of ethylenically unsaturated hydrocarbons, acrylonitrile, and esters of acrylic or methacrylic acid.

6. A method according to claim 5 where said reactant is hexachloroplatinic acid, said organosilicon compound is an ethylenically unsaturated organosiloxane and said liquid is a cyclic or linear polydiorganosiloxane.

7. A method according to claim 6 where said ethylenically unsaturated siloxane is a hexaorganodisiloxane.

8. A method according to claim 6 where said hexaorganodisiloxane is hexamethyldisiloxane and said liquid is a linear or cyclic polydimethylsiloxane.

* * * * *